United States Patent
Kundel (10) Patent No.: US 9,371,856 B2
(45) Date of Patent: Jun. 21, 2016

(54) NON-CONTACT THRUST BEARING USING PERMANENT MAGNETS

(71) Applicant: Stephen Kundel, Warren, OH (US)

(72) Inventor: Stephen Kundel, Warren, OH (US)

(*) Notice: Subject to any disclaimer, the term of this patent is extended or adjusted under 35 U.S.C. 154(b) by 515 days.

(21) Appl. No.: 13/904,646

(22) Filed: May 29, 2013

(65) Prior Publication Data

US 2014/0035411 A1 Feb. 6, 2014

Related U.S. Application Data (60) Provisional application No. 61/679,250, filed on Aug. 3, 2012.

(51) Int. Cl.
*F16C 32/04* (2006.01)
*H02K 7/09* (2006.01)
*F03D 11/00* (2006.01)

(52) U.S. Cl.
CPC ........ *F16C 32/0423* (2013.01); *F03D 11/0008* (2013.01); *F03D 80/70* (2016.05);
(Continued)

(58) Field of Classification Search
CPC ... H02K 7/09; F16C 32/0406; F16C 32/0408; F16C 32/041; F16C 32/0412; F16C 32/0414; F16C 32/0417; F16C 32/0419; F16C 32/0421; F16C 32/0423; F16C 31/0425; F16C 31/0427; F16C 32/0429; F16C 32/0431; F16C 2360/31; F03D 11/0008
USPC ......................................................... 310/90.5
See application file for complete search history.

(56) References Cited

U.S. PATENT DOCUMENTS 561,144 A   6/1896  Trudeau
1,724,446 A   8/1929  Worthington (Continued)

FOREIGN PATENT DOCUMENTS

DE   19850314 A1   5/2000
JP   02093120 A  *  4/1990
WO   WO02101908 A1   12/2002

OTHER PUBLICATIONS

Magnetic Pole Transitions v1.2, *Oersted Technology*, Joseph Stupak, Jr., Sep. 26, 2008 http://www.oersted.com/magnetics_articles.shtml.

(Continued)

*Primary Examiner* — Quyen Leung
*Assistant Examiner* — Eric Johnson
(74) *Attorney, Agent, or Firm* — Roth Blair Roberts Strasfeld & Lodge (57) ABSTRACT

A magnetic thrust bearing for use in a device for relatively free rotational movement of a first part relative to a second part includes axial and laterally spaced magnets. Each magnet has a magnetic field of force with opposing poles and a transition section which converges to a transition line. Axial magnets are spaced on an axis of the first part of the device and lateral magnets are arranged on the second part of the device. The lateral magnets operating in units, having paired lateral magnets positioned on opposite sides of the axis with each of the paired magnets having an equal length and equal gap or space from the axis. Axial magnets have an alternating polar orientation such that the nearest magnetic poles of adjacent axial magnets are repelling, and the distance between transition lines of the axial magnets is substantially equal to the length of the lateral magnets. Accordingly, the magnetic field of force of each lateral magnetic unit is perpendicular and attracting to the repelling fields of force between adjacent axial magnets for lateral displacement of the first part relative to the second part by a fixed gap, so that, with this arrangement, the permanent-magnet bearing enables non-contact, relative motion between the two parts of the device using both attractive and repelling forces generated by magnets.

3 Claims, 7 Drawing Sheets

(52) U.S. Cl.
CPC ......... *F16C32/0408* (2013.01); *F16C 32/0427* (2013.01); *H02K 7/09* (2013.01); *F05B 2240/211* (2013.01); *F05B 2240/511* (2013.01); *F16C 2360/31* (2013.01); *Y02E 10/722* (2013.01)

(56) References Cited

U.S. PATENT DOCUMENTS

| | | | |
|---|---|---|---|
| 2,305,416 A * | 12/1942 | Hansen, Jr. | ............ F16C 39/063 310/90.5 |
| 2,790,095 A | 4/1957 | Peek et al. | |
| 2,943,216 A | 6/1960 | Spodig | |
| 3,469,130 A | 9/1969 | Jines et al. | |
| 3,614,181 A | 10/1971 | Meeks | |
| 3,703,653 A | 11/1972 | Tracy | |
| 3,811,058 A | 5/1974 | Kiniski | |
| 3,879,622 A | 4/1975 | Ecklin | |
| 3,890,548 A | 6/1975 | Gray | |
| 3,899,703 A | 8/1975 | Kinnison | |
| 3,967,146 A | 6/1976 | Howard | |
| 3,992,132 A | 11/1976 | Putt | |
| 4,011,477 A | 3/1977 | Scholin | |
| 4,151,431 A | 4/1979 | Johnson | |
| 4,179,633 A | 12/1979 | Kelly | |
| 4,196,365 A | 4/1980 | Presley | |
| 4,267,647 A | 5/1981 | Anderson et al. | |
| 4,398,773 A | 8/1983 | Boden et al. | |
| 4,629,921 A | 12/1986 | Gavaletz | |
| 4,751,486 A | 6/1988 | Minato | |
| 4,983,869 A | 1/1991 | Vaidya et al. | |
| 5,043,615 A * | 8/1991 | Oshima | ............... F16C 32/0408 310/152 |
| 5,402,021 A | 3/1995 | Johnson | |
| 5,594,289 A | 1/1997 | Minato | |
| 5,634,390 A | 6/1997 | Takeuchi et al. | |
| 5,751,083 A | 5/1998 | Tarnura et al. | |
| 5,925,958 A | 7/1999 | Pirc | |
| 6,169,343 B1 | 1/2001 | Rich, Sr. | |
| 6,218,751 B1 | 4/2001 | Bohlin | |
| 6,343,419 B1 | 2/2002 | Litman et al. | |
| 6,368,083 B1 | 4/2002 | Wampler | |
| 6,424,068 B2 * | 7/2002 | Nakagishi | ............... B82Y 10/00 310/90.5 |
| 6,700,258 B2 | 3/2004 | McMullen et al. | |
| 6,806,605 B1 * | 10/2004 | Gabrys | ................. F16C 32/041 310/90 |
| 6,841,909 B2 | 1/2005 | Six | |
| 7,112,903 B1 * | 9/2006 | Schob | ................ F16C 32/0465 310/90.5 |
| 7,126,666 B2 * | 10/2006 | De Weerdt | ............ F16C 39/063 250/548 |
| 7,151,332 B2 | 12/2006 | Kundel | |
| 7,382,106 B2 | 6/2008 | Kundel | |
| 7,400,069 B2 | 7/2008 | Kundel | |
| 7,859,157 B2 * | 12/2010 | Baur | ....................... F16C 32/04 310/90.5 |
| 7,911,100 B2 * | 3/2011 | Chassoulier | ........... B64G 1/286 310/90.5 |
| 2001/0021165 A1 * | 9/2001 | Nakagishi | ............... B82Y 10/00 369/255 |
| 2002/0167236 A1 | 11/2002 | Long | |
| 2004/0124719 A1 | 7/2004 | Aoshima et al. | |
| 2004/0140722 A1 | 7/2004 | Long | |
| 2005/0126554 A1 * | 6/2005 | Minica | .................... F14B 5/143 124/44.5 |
| 2015/0115756 A1 * | 4/2015 | Walsh | ................. F16C 32/0408 310/90.5 |

OTHER PUBLICATIONS

Magnetic bearings in kinetic energy storage systems for vehicular applications, *J. Electrical Systems*, Johan Abrhamsson, Hans Bernhoff, Jul. 2, 2011 http://journal.esrgroups.org/jes/papers/jes7_2_7.pdf.

Optimal Design of Non-Contact Thrust Bearing Using Permanent Magnet Rings, *International Journal of Precisions Engineering and Manufacturing*, vol. 12, No. 6, pp. 1009-1014, Seong-Yeol Yoo, Woo-Yeon Kim, Seung-John Kim, Wook-Ryun Lee, Yong-Chae Bae and Myoungguy Noh, Dec. 2011 http://link.springer.com/article/10.1007%2Fs12541-011-0134-4#page-1.

\* cited by examiner

NON-CONTACT THRUST BEARING USING PERMANENT MAGNETS

This patent application claims priority under 35 U.S.C. §119 to U.S. Provisional Patent Application Ser. No. 61/679,250, filed Aug. 3, 2012, which is incorporated herein by reference in its entirety.

FIELD OF THE INVENTION

The invention relates to a magnetic thrust bearing and more particularly to a magnetic thrust bearing that uses permanent magnets uniquely oriented to provide highly efficient rotational movement of a first part relative to a second part about an axis.

BACKGROUND

A permanent-magnet bearing is a mechanical device which enables non-contact relative motion between parts of the device using attractive or repelling forces generated by magnets. Permanent-magnet thrust bearings have been applied to flywheel systems, hard disc drive spindle motors, and magnetically levitated conveyor systems. They are ideally suited to enhance the overall efficiency of the device.

Magnetic bearings are ordinarily constructed using a set of two co-axial permanent-magnet rings as seen, for example, in U.S. Pat. No. 3,614,181 (Meeks). If the two rings are axially aligned, then radially repelling forces between the rings develop, resulting in a radial bearing. If one ring is axially displaced from the other, the direction and magnitude of the radial and axial forces change and, at some axial offset, the set of two rings can be used as a thrust bearing.

SUMMARY OF THE INVENTION

This invention includes a unique design of a thrust bearing made of permanent-magnets. Moreover, this invention uses a unique magnetic pattern between two parts (i.e., with optional axial and lateral separation and novel orientation between one or more axial magnets on the first part relative to one or more lateral magnetic units on a second part), wherein the first and second parts are coaxially aligned and rotatable relative to each other. To optimize the load capacity of the permanent-magnet thrust bearing in this invention for the task at hand, changes to a host of parameters can be easily made, including modifications to magnet sizes and strengths, adjusting the number of magnetic layers or stacks, increasing or decreasing a gap between the axial magnets and lateral magnetic units, and/or changing the distance between axial magnets.

BRIEF DESCRIPTION OF THE DRAWINGS

These and other advantages of the present invention will become apparent to those skilled in the art, particularly from the following detailed description of a preferred embodiment when considered in the light of the accompanying drawings, in which.

DETAILED DESCRIPTION OF EMBODIMENTS

Figure 1:
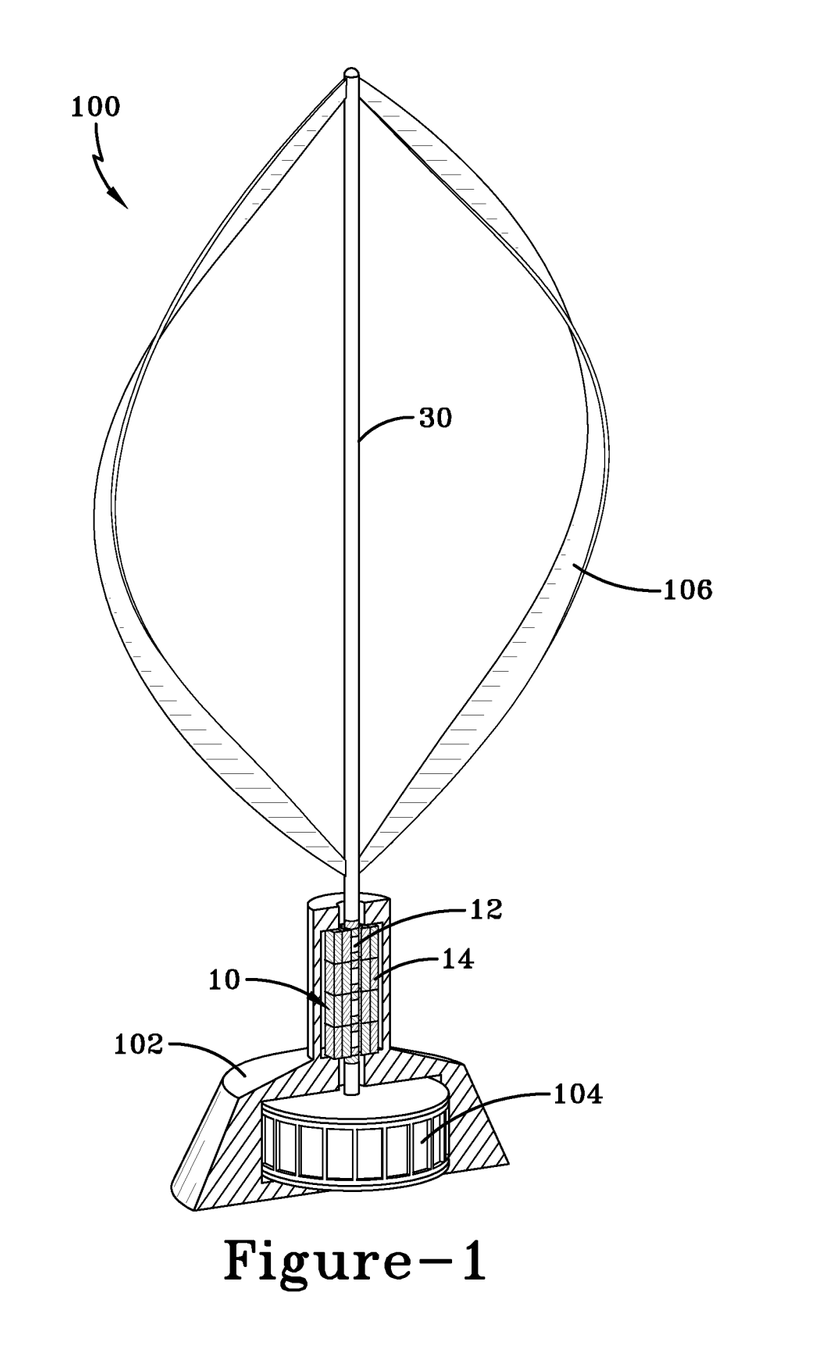
FIG. 1 is a partial sectional view of a vertical wind generator utilizing a thrust bearing of the instant invention for rotation of turbine blades of the generator.
Figure 2:
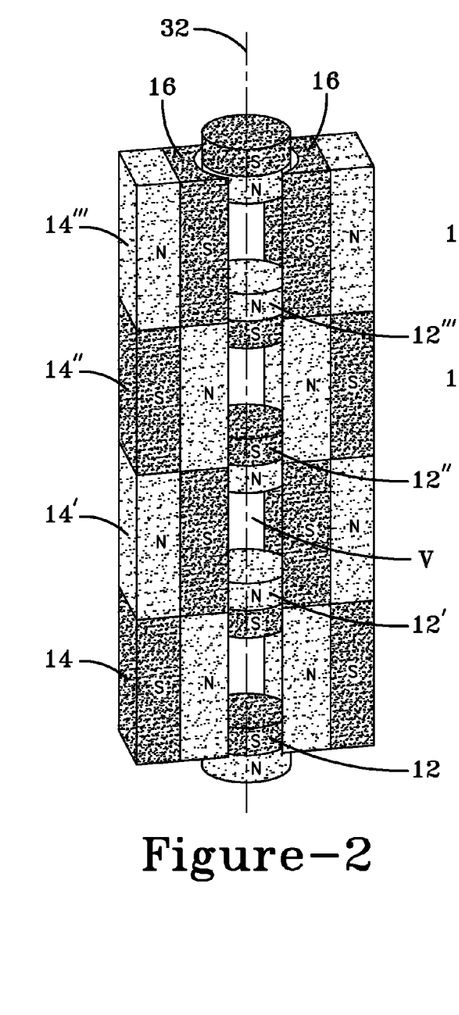
FIG. 2 shows the orientation of laterally spaced magnets of the thrust bearing having a first set of axially spaced magnetics on the first part relative to laterally spaced magnetic units on a second part according to this invention.
Figure 3:
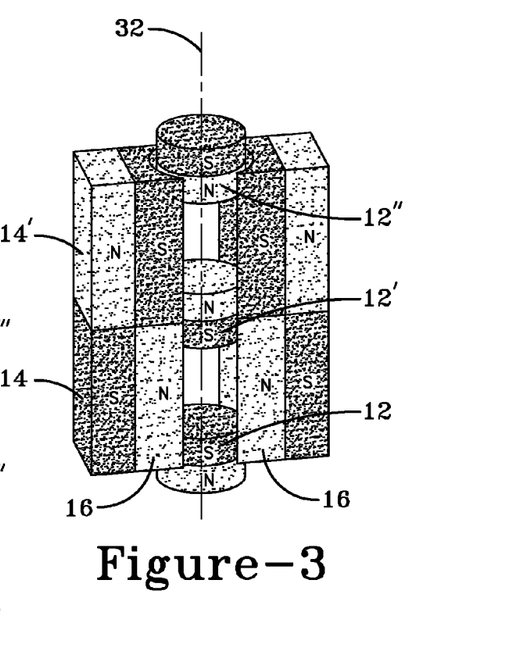
FIG. 3 illustrates the axially and laterally spaced magnets of FIG. 2 with a scaled down number of magnetic layers or stacks to reduce load capacity.
Figure 4:
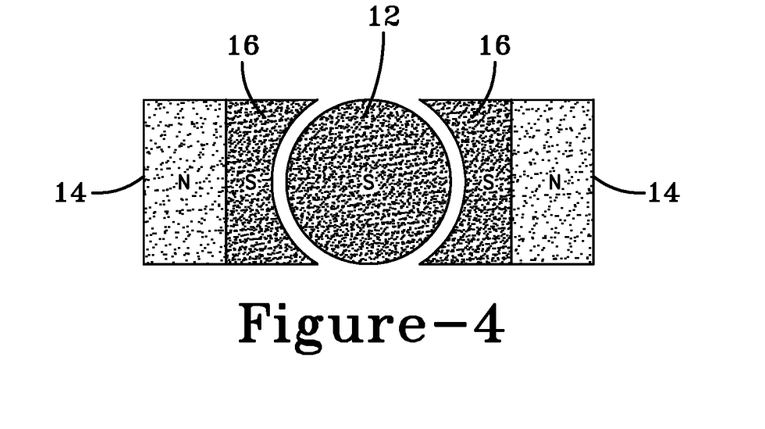
FIG. 4 is a plan view of FIG. 2.
Figure 5:
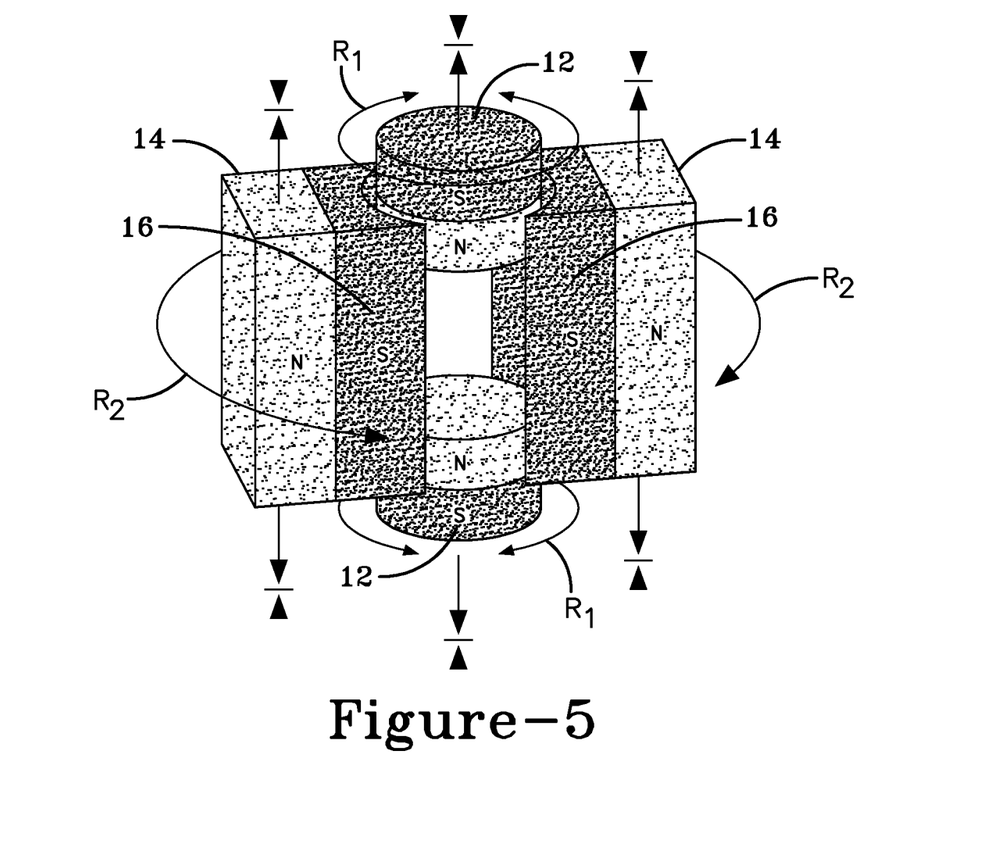
FIG. 5 illustrates alignment of the first set of axially spaced magnets on the first part relative to the laterally spaced magnetic units of the second part, wherein the first and second parts are coaxially aligned and rotatable relative to each other.
Figure 7A:
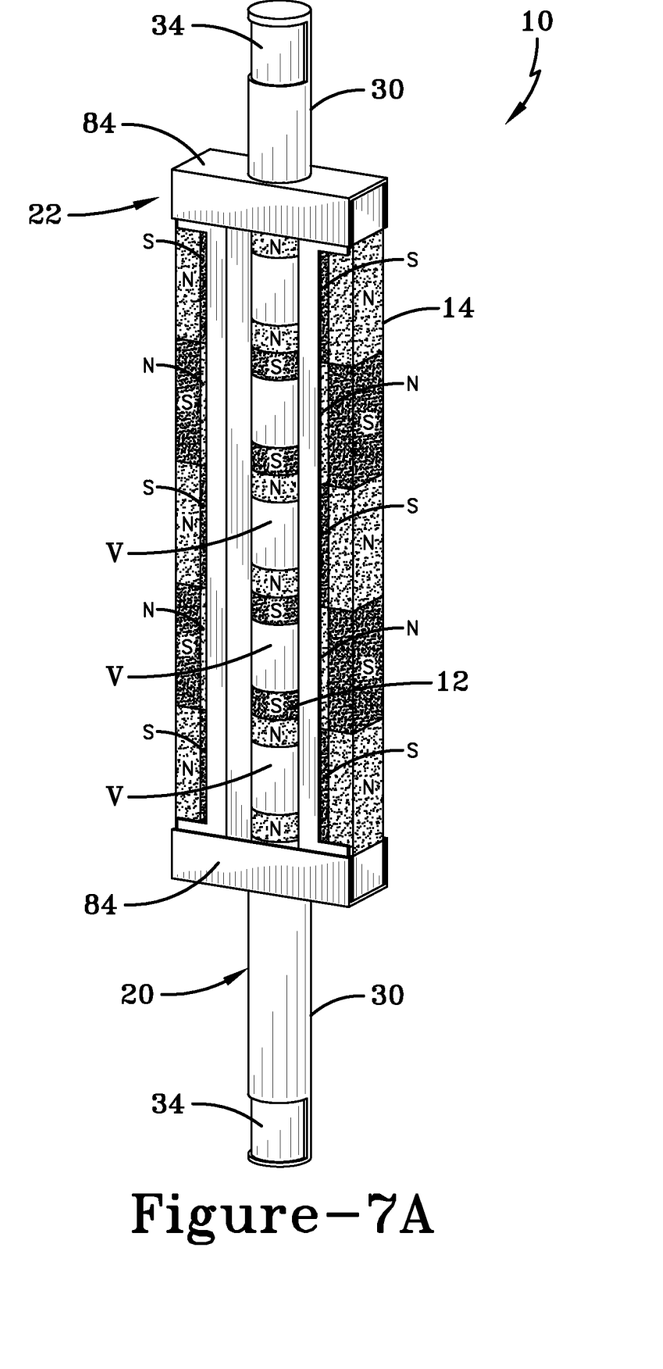
FIG. 7A shows a support frame of the device with a cutout section of a tubular shaft to best show the configuration and alignment of axial magnets relative to spaced lateral magnetics (i.e., paired in units and oriented as shown in FIG. 2)

Turning to the drawings, wherein like call-out numbers designate identical or correspondingly identical components, a preferred configuration of the invention is shown using permanent magnets 12, 14 of a magnetic thrust bearing 10. Each magnet has a magnetic field of force with opposing poles and a transition section which converges to a transition line T. Moreover, with reference to FIGS. 1 and 7C, a tubular shaft 30 of the support frame 80 includes a plurality of permanent axially aligned and spaced magnets 12 with a pattern of alternately aligned, opposing magnetic poles or fields of force between adjacent magnets (i.e., axial magnets are generally identified as 12 as shown in FIG. 7A and individually identified herein as magnets 12, 12', 12", etc., as shown in FIG. 2). The axial magnets 12 are stacked within the tubular shaft 30 in an alternating pattern, so that like poles are spaced adjacent by a void to neighboring axial magnets 12, 12', 12", etc.

Figure 6A:
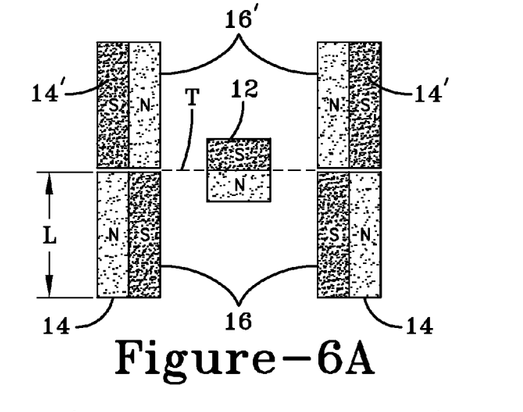
FIG. 6A illustrates the orientation of magnets and units on the first and second parts, respectively, in a suspended equilibrium state.
Figure 6B:
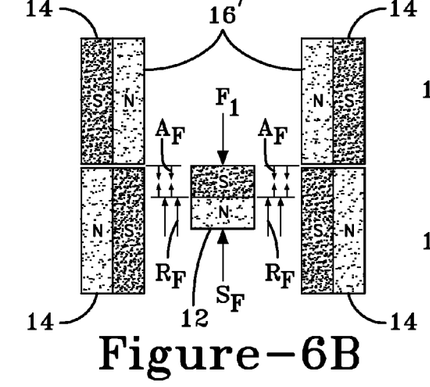
FIGS. 6B and 6C illustrate a change of repelling and attractive magnetic forces relative the first or second parts with outside axial forces applied in opposite directions, respectively.
Figure 6C:
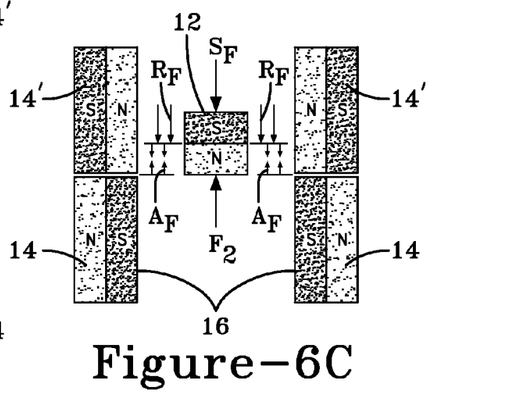
Figure 6D:
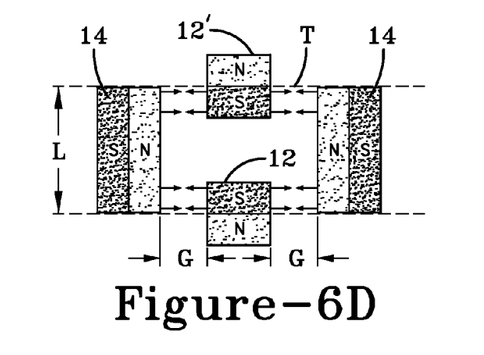
FIG. 6D shows the equal axially spaced gap between magnets of the first and second parts in the suspended equilibrium state.

The axial magnets 12 are spaced, such that the distance between a polar transition line T of adjacent axial magnets 12, 12', 12" etc. is substantially equal to a length L (relative the axis 32 as best seen in FIGS. 6A and 6D) of the correspondingly paired lateral spaced magnets 14. These lateral magnet units 16 are arranged so that the magnetic field of force of each is stabilized by attraction to corresponding perpendicularly oriented axial magnets 12. More specifically, the magnetic fields of force of individual lateral magnetic units 16, 16', etc. are preferably neutralized by the perpendicular magnetic fields of force of corresponding radially adjacent axial magnetics 12, 12', etc.

Figure 7B:
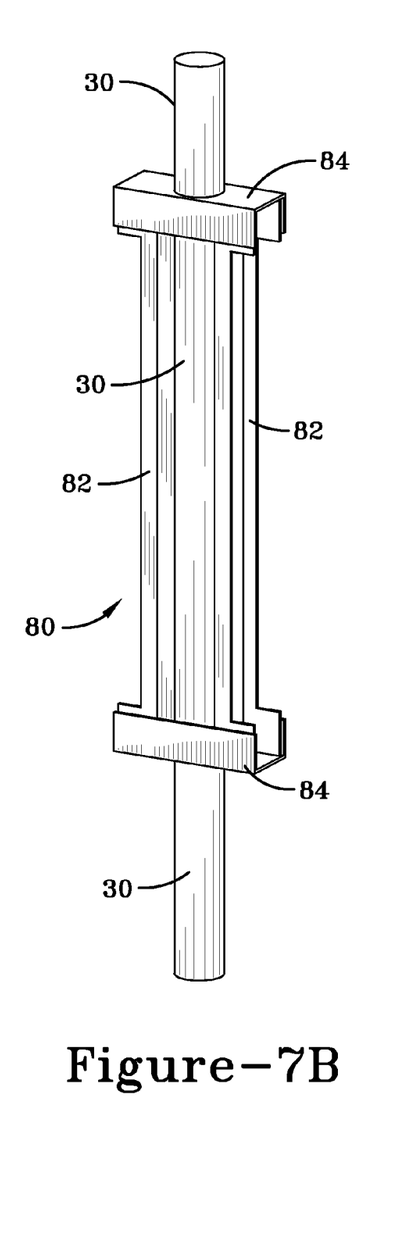
FIGS. 7B and 7C show the support frame assembled and unassembled, respectively.
Figure 7C:
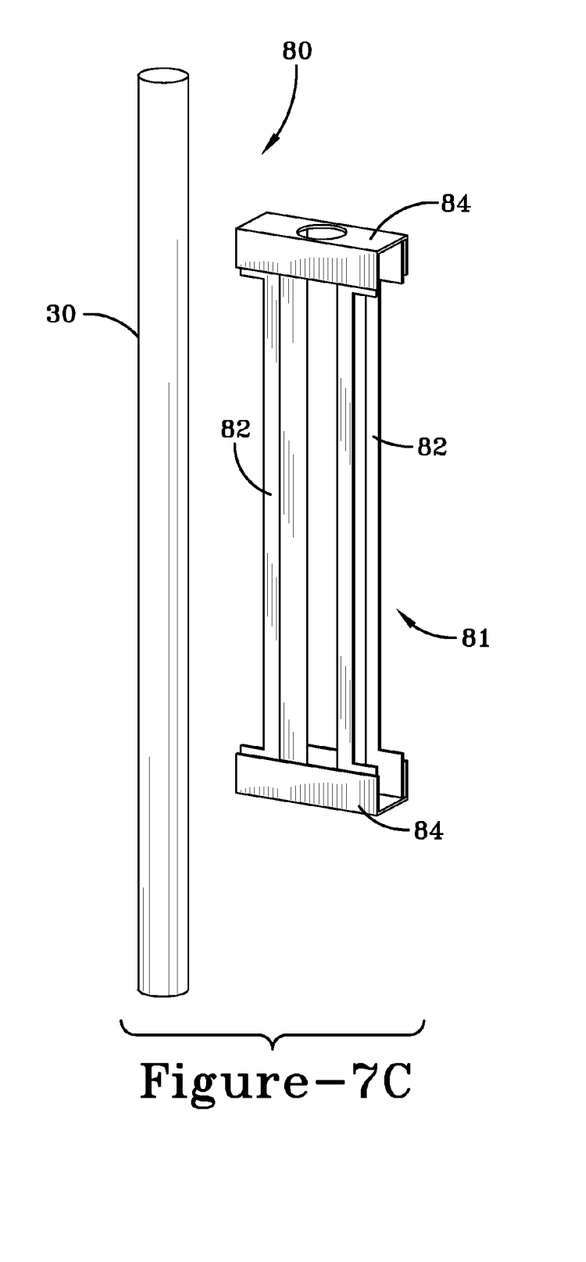
Figure 8A:
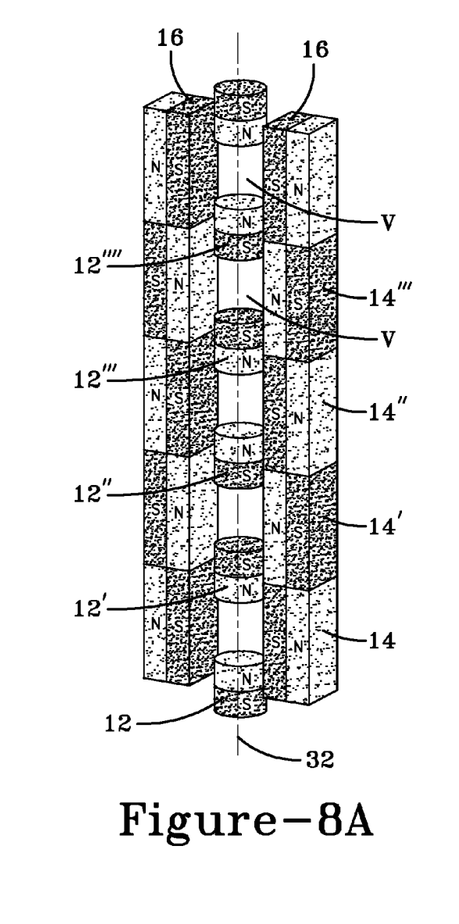
FIG. 8A is similar to FIG. 2 which illustrates the preferred arrangement of axial magnets and laterally spaced magnetic units but with a flat-face inside surface for assembly in the support frame of FIGS. 7A-C.
Figure 8B:
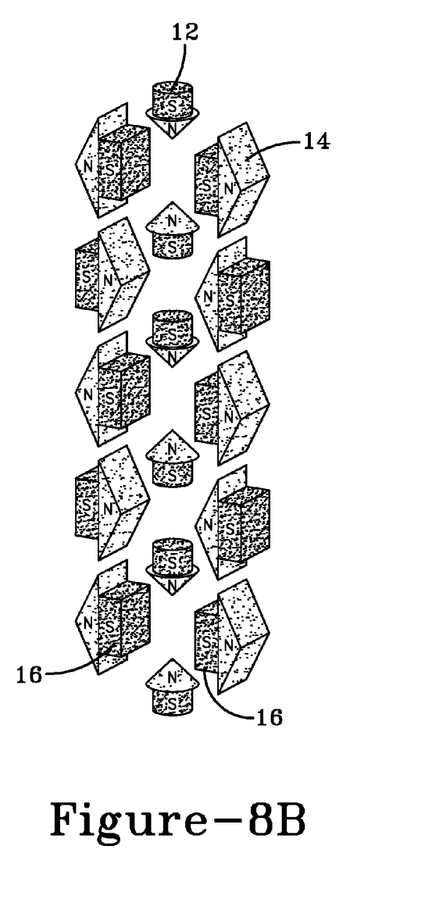
FIG. 8B illustrates the magnetic field orientations of the axial magnets and laterally spaced magnetic units of FIG. 8A.

Moreover, the preferred arrangement of the axial and lateral magnets 12, 14, respectively, in the support frame 80 is illustrated best in FIGS. 7 and 8A. With this configuration, the first part 20 of the magnetic thrust bearing 10 includes the plurality of permanent axial magnets 12 stacked, spaced (via a void V) and aligned in the tubular shaft 30. Moreover, the tubular shaft 30 is aligned along a rotational axis 32. The magnetic fields of force of the axial magnets 12 are arranged in alternating polar orientation (i.e., the magnetic poles of adjacent axial magnets 12, 12', 12", etc. are repelling as seen in FIG. 8B). The second part 22 of the magnetic thrust bearing 10 includes the carriage 81 having opposing U-shaped channels 82 to house the lateral magnets 14 spaced laterally in relationship to the rotational axis 32 and fixed in place by yoke-like end members 84. The yoke-like end members 84 fix the lateral magnets 14 in channels 82 in a spaced, lateral relationship (i.e., forming a gap G seen in FIG. 6D) with the axial magnets 12 in the tubular shaft 30.

Further, with regard to the second part 22, the magnets 14 are arranged in the U-shaped channels 82 in laterally spaced pairs (i.e., for purpose of this discussion, lateral magnets are generally identified as 14 as shown in FIGS. 7A-7C, while adjacent lateral magnets individually identified herein as magnets 14, 14', 14", etc., as shown in FIG. 2). With reference to FIG. 2, each lateral magnet (for example, 14') of the second part 22 is fixed in its respective U-shaped channel 82 by attraction to its immediately adjacent lateral magnets (corresponding, 14 and 14"). Still further, lateral magnets 14 in the first U-shaped member 82 are substantially identical in size, shape and magnetic force, and therefore, easily paired, with its corresponding paired lateral magnets in the second U-shaped member 82. Each pair of magnets 14, 14', 14", etc. operates as a unit 16, 16', 16", etc., respectively, and each lateral magnetic unit 16 has a magnetic field of force with opposing poles arranged perpendicular to the rotational axis 32 of the thrust bearing 10 for rotation of the first part 20 relative the second part 22 (i.e., $R_1$ and/or $R_2$ around the axis 32). Moreover, the magnetic fields of force of the lateral magnetic units 16 are aligned to attract, at its ends, to corresponding axial magnets 12. Further, paired lateral magnetic units 16, 16', etc. are oriented so that like-magnetic poles face toward the axis 32. Still further, the inwardly facing magnetic poles of the paired lateral magnet units 16, 16', etc. are oriented in an alternating pattern, so that the axial magnets 12 of the first part 20 are attracted to corresponding spaced and adjacent lateral magnet units 16 of the second part 22.

In addition to the magnetic thrust bearing 10 described above, the axial magnets 12 may be used to move the second part 22 of the thrust bearing along the axis 32 of the tubular shaft 30. More particularly, like a piston, the axial magnets 12 may be confined in a cylindrical-like part that slides to and fro along the axis 32 in the hollow cylinder of the tubular shaft 30. The confined axial magnets 12 are moved along the axis using the tubular shaft 30 by applying outside forces $F_1$, $F_2$. Outside forces $F_1$, $F_2$ may be applied to either the axial magnets 12 or lateral magnetic units 16. As the axial magnets 12 move to and fro (i.e., up and down the axis 32 as shown in FIGS. 6B and 6C), the attracting polar fields of force between lateral magnetic units 16, 16', etc. and axial magnets 12, 12', etc. would move the carriage of the second part 22 to follow along the outside of the tubular shaft 30. Moreover, an outside force $F_1$ or $F_2$ along the axis 31 will result in both attraction $A_F$ and repelling $R_F$ forces of axial and lateral magnets 12, 14, respectively, creating a spring effect or spring-like force $S_F$ to urge the arrangement back against the corresponding outside force $F_1$ or $F_2$ to the equilibrium state, regardless of the position of the lateral magnets 14 relative to the axial magnets 12 in its 360° rotation thereabout. Further, there is a gap G between the first and second parts 20, 22, respectively, of the instant thrust bearing 10 (i.e., no contact therebetween). More specifically, each lateral magnet 14 has an equal axially spaced gap G from its corresponding axial magnet 12. Therefore, equal attraction forces on opposite sides are negated, thereby suspending the lateral magnets 14 from the axial magnets 12. As a result, movement of second part 22 along the tubular shaft 30, as well as 360° rotation of the first part 20 relative to the second part 22, is virtually frictionless.

In assembly of the preferred embodiment, like lateral magnets 14 are arranged in position in the first U-shaped channel 82 of the second part 22 with an alternating polarity configuration as discussed above. As a result of this configuration, the magnets are fixed by attraction in the carriage 81, as best seen in FIGS. 7A-7C. The same configuration is then assembled in the second U-shaped member 82 of the carriage 81, so that the first lateral magnet 14 in the first U-shaped channel is oriented and paired in a mirror image configuration to the first lateral magnet 14 in the second U-shaped channel. This paired configuration (i.e., first lateral magnetic unit 16) is then repeated, so that the second, third, and fourth lateral magnets 14', 14", 14''' in the first U-shaped channel are paired with the second, third, and fourth lateral magnets 14', 14", 14''', respectively, in the second U-shaped channel. Each pair of lateral magnets forms the corresponding "lateral magnetic unit 16" of the second part 21. Preferably, there are four or more stacked lateral magnetic units 16 in the carriage 81. Of course, as stated above, the thrust load or capacity of the magnetic thrust bearing 10 can by increased by increasing the stacking, size, number and/or strength of lateral magnetic units 16 with the corresponding axial magnets 12.

Still further in assembly, the tubular shaft 30 of the first part 20 is fitted with an end cap 34. Axial magnets 12 are then inserted and stacked in the tube 30 with a repeating reverse polar orientation as discussed above and shown in FIG. 2 (e.g., the first axial magnet 12 being positive-negative, the second axial magnet 12' being negative-positive, the third 12" being positive-negative, etc.). With this configuration, the stacked axial magnets 12 will separate (to form a void V) due to the repulsive or repelling forces between adjacent axial magnets. Therefore, the magnets need to be held in place using a cap 34 at the opposite open end of the tubular shaft 30. The tubular shaft 30 is then fitted with the carriage 81 by passing the shaft through an opening (not shown) in the yoke-like end members 84. The end cap 34 is then pushed into the tubular shaft to force the axial magnets 12 in alignment as shown in FIG. 7A.

Once the axial magnets 12 are placed in proper space relationship with the lateral magnetic units 16 in the carriage 81 of the second part 22, the poles of the magnetic fields of force are stabilized by attraction in a direction radial to the axis 32 of rotation of the first part 20 relative to the second part 22. More particularly, the fields of force of the axial magnets 12 of the first part 20 are perpendicular and attracting to the fields of force of the lateral magnetic units 16 of the second part for lateral displacement of the first and second parts 20, 22, respectively, by a fixed gap G for relatively free, frictionless rotation $R_1$, $R_2$ therebetween. With this arrangement, as opposed to the prior art, the permanent-magnet bearing 10 enables non-contact relative rotational motion between parts of the mechanical device (e.g., a wind turbine 100 with a base 102, generator 104, and rotor blades 106 as shown in FIG. 1) by using both attractive and repelling forces generated by magnets to stay in alignment.

In accordance with the provisions of the patent statute, the present invention has been described in what is considered to represent its preferred embodiment. However, it would be noted that the invention can be practiced otherwise than as specifically illustrated and described without departing from its spirit or scope. It is intended that all such modifications and alterations be included insofar as they come within the scope of the appended claims or the equivalents thereof.

What is claimed is:

1. A magnetic thrust bearing for use in a device for rotational movement of a first part relative to a second part, the magnetic thrust bearing comprising:
    at least one axial magnet arranged on an axis of the first part of the device;
    at least two magnetic units arranged on the second part of the device, each magnetic unit of the second part includes a pair of magnets laterally spaced from and positioned on opposite sides of the axis; and, wherein
        each axial and lateral magnet is a permanent magnet having opposing poles with a transition section converging to a transition line between the opposing poles; and
        an orientation of each of the paired magnets of the lateral magnetic units have like poles facing toward the axis with the respective opposing pole on a side away from the axis so that the transition line of each lateral magnet is parallel to the axis, and the poles of the axial magnet being arranged to attract the lateral magnetic units in a direction radial to the axis of rotation of the first part relative to the second part, and further wherein the axial magnet of the first part being arranged in relation to the lateral magnetic units of the second part such that the transition line of the axial magnet is perpendicular to the axis and attracting to both of the at least two lateral magnetic units for lateral displacement of the first part relative to the second part by a fixed, constant gap.

2. The magnetic thrust bearing of claim 1, wherein:
    the transition line of the axial magnet is substantially aligned between abutting end portions of the lateral magnetic units when in an equilibrium state.

3. A magnetic thrust bearing for use in a device for rotational movement of a first part relative to a second part, the magnetic thrusting bearing comprising:
    at least two axial magnets spaced adjacent on an axis of the first part of the device;
    a lateral magnetic unit arranged on the second part of the device, the lateral magnetic unit including a pair of magnets with each of the paired magnets having an equal axial length, and the paired magnets being laterally spaced and positioned on opposite sides of the axis; and, wherein
        each axial and lateral magnet is a permanent magnet having opposing poles and a transition section converging to a transition line between the respective opposing poles;
        the axial magnets having an alternating polar orientation such that the nearest magnetic poles of the adjacent axial magnets are repelling relative to each other, and the distance between the transition lines of the axial magnets is substantially equal to the length of the lateral magnets; and
        the lateral magnetic unit having a polar orientation with the corresponding transition lines of the paired magnets arranged perpendicular to the transition lines of the axial magnets for radial attraction and lateral displacement by suspension of the first part relative to the second part by a fixed, constant gap.

* * * * *